(12) United States Patent
Pearson et al.

(10) Patent No.: US 9,453,593 B2
(45) Date of Patent: Sep. 27, 2016

(54) TUBE-RETAINING ASSEMBLY

(71) Applicant: ILLINOIS TOOL WORKS INC., Glenview, IL (US)

(72) Inventors: Timothy D. Pearson, New Lenox, IL (US); Christopher M. Pangallo, Frankfort, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/357,218

(22) PCT Filed: Nov. 8, 2012

(86) PCT No.: PCT/US2012/064072
§ 371 (c)(1),
(2) Date: May 9, 2014

(87) PCT Pub. No.: WO2013/070858
PCT Pub. Date: May 16, 2013

(65) Prior Publication Data
US 2014/0374544 A1    Dec. 25, 2014

Related U.S. Application Data

(60) Provisional application No. 61/558,547, filed on Nov. 11, 2011.

(51) Int. Cl.
*F16L 3/10*    (2006.01)
*F16L 3/223*    (2006.01)
(Continued)

(52) U.S. Cl.
CPC ............ *F16L 3/1075* (2013.01); *F16L 3/1025* (2013.01); *F16L 3/12* (2013.01); *F16L 3/222* (2013.01); *F16L 3/223* (2013.01); *F16L 3/2235* (2013.01)

(58) Field of Classification Search
CPC ... F16L 3/1033; F16L 3/1041; F16L 3/1075; F16L 3/10; F16L 3/1025; F16L 3/12; F16L 3/18; F16L 3/22; F16L 3/222; F16L 3/223; F16L 3/2235; H02G 3/26; H02G 3/32
USPC .................................................. 248/68.1, 69
See application file for complete search history.

(56) References Cited

U.S. PATENT DOCUMENTS 3,913,187 A * 10/1975 Okuda ........................... 24/484
4,566,660 A    1/1986 Anscher et al.
(Continued)

FOREIGN PATENT DOCUMENTS

DE    102009005422 A1    7/2010
EP         0517465 A1    12/1992
(Continued)

OTHER PUBLICATIONS

ISR and WO for PCT/US2012/064072 mailed Jan. 4, 2013.

*Primary Examiner* — Michael Safavi
(74) *Attorney, Agent, or Firm* — Joseph M. Butscher; The Small Patent Law Group, LLC (57) ABSTRACT

A fastener assembly is configured to secure a tubular member to a structure. The fastener assembly may include a stud retainer configured to receive and retain a fastener that is configured to securely fasten the assembly to the structure, a tube-retaining section having interior walls that define a tube channel configured to receive the tubular member, and an adaptable tube-engaging member extending into the tube channel. The adaptable tube-engaging member is configured to securely engage a portion of the tubular member.

8 Claims, 6 Drawing Sheets

(51) Int. Cl.
*F16L 3/12* (2006.01)
*F16L 3/22* (2006.01)

(56) References Cited

U.S. PATENT DOCUMENTS

| | | | | |
|---|---|---|---|---|
| 4,775,121 | A | * | 10/1988 | Carty .......................... 248/68.1 |
| 5,115,542 | A | * | 5/1992 | Gehres ............................ 24/543 |
| 5,263,671 | A | * | 11/1993 | Baum .......................... 248/68.1 |
| 5,363,539 | A | * | 11/1994 | Tisol ............................... 24/543 |
| 5,535,969 | A | * | 7/1996 | Duffy, Jr. ..................... 248/68.1 |
| 5,613,655 | A | * | 3/1997 | Marion ........................ 248/68.1 |
| 5,653,411 | A | * | 8/1997 | Picco et al. .................. 248/74.1 |
| 5,820,048 | A | * | 10/1998 | Shereyk et al. ............. 248/68.1 |
| 5,947,426 | A | | 9/1999 | Kraus |
| 6,926,237 | B2 | | 8/2005 | Shereyk |
| 7,172,162 | B2 | * | 2/2007 | Mizukoshi et al. ......... 248/68.1 |
| 7,207,528 | B2 | * | 4/2007 | Kato ............................... 248/55 |
| 7,267,307 | B2 | | 9/2007 | Bauer |
| 7,387,282 | B2 | * | 6/2008 | Kovac .......................... 248/74.4 |
| 7,802,762 | B2 | | 9/2010 | Bauer |
| 7,887,012 | B2 | * | 2/2011 | Desai et al. .................... 248/55 |
| 8,246,583 | B2 | * | 8/2012 | Bierman ........................ 604/174 |
| 8,672,276 | B2 | * | 3/2014 | Fukumoto ................... 248/67.5 |
| 8,882,072 | B2 | * | 11/2014 | Hattori et al. .......... 248/346.03 |
| 8,979,461 | B2 | | 3/2015 | Pearson |
| 2006/0099049 | A1 | | 5/2006 | Peterson |
| 2006/0273226 | A1 | * | 12/2006 | Jatzke .......................... 248/68.1 |
| 2007/0215757 | A1 | | 9/2007 | Yuta |
| 2009/0026673 | A1 | | 1/2009 | Clark |
| 2009/0028668 | A1 | | 1/2009 | Luk |

FOREIGN PATENT DOCUMENTS

| | | |
|---|---|---|
| EP | 0758728 A1 | 2/1997 |
| EP | 1058067 A2 | 12/2000 |
| JP | H01122576 U | 8/1989 |
| JP | 2002005340 A | 1/2002 |
| WO | 2010081735 A1 | 7/2010 |
| WO | 2011123323 A1 | 10/2011 |

* cited by examiner

TUBE-RETAINING ASSEMBLY

RELATED APPLICATIONS

This application is a National Phase of International Application Number PCT/US2012/064072 filed Nov. 8, 2012 and relates to and claims priority benefits from U.S. Provisional Patent Application No. 61/558,547 entitled "Tube-Retaining Assembly," filed Nov. 11, 2011, which is hereby incorporated by reference in its entirety.

FIELD OF EMBODIMENTS OF THE INVENTION

Embodiments generally relate to a tube-retaining assembly configured to securely connect conduits or tubes to a frame, panel, or the like, such as within an automobile.

BACKGROUND

Various components, such as conduits and tubes, may be secured to surfaces, such as walls, ceilings or the like, through fastening assemblies. For example, a cylindrical tube may be secured to a wall through a fastening assembly having a tube channel that snapably, latchably, or otherwise secures around a portion of the tube. The fastening assembly itself may be secured to the wall through a stud that is received and retained by a stud retainer, for example, that may be integrally formed with the fastening assembly.

However, the channels within the fastening assembly are typically configured to retain tubes having a certain diameter. The channels may not be able to accommodate tubes having smaller or larger diameters. For example, a tube having a smaller outer diameter than the inner diameter of the channel may axially shift within the channel. Accordingly, the fastening assembly may be incapable of securely retaining the smaller diameter tube.

Conversely, a tube having a larger outer diameter than the inner diameter of the channel is typically unable to fit within the channel. As such, the fastening assembly may be incapable of even receiving the tube.

SUMMARY OF EMBODIMENTS OF THE INVENTION

Certain embodiments provide a fastener assembly that is configured to secure a tubular member to a structure. The fastener assembly may include a stud retainer configured to receive and retain a fastener that is configured to securely fasten the assembly to the structure, a tube-retaining section having interior walls that define a tube channel configured to receive the tubular member, and an adaptable tube-engaging member extending into the tube channel. The adaptable tube-engaging member is configured to securely engage a portion of the tubular member.

The adaptable tube-engaging member is flexible and resilient, and may be configured to securely engage multiple tubular members of different shapes and sizes. The adaptable tube-engaging member may be configured to wrap around more than half an outer circumference of the tubular member.

The adaptable tube-engaging member may include opposed flexing protuberances. Each of the opposed flexing protuberance may include an arcuate finger configured to engage around a portion of the tubular member. In an embodiment, the opposed flexing protuberances are configured to wrap around more than half an outer circumference of the tubular member.

The adaptable tube-engaging member may include at least one flexible securing protuberance. The at least one flexible securing protuberance may include an extension beam integrally connected to an arcuate beam. The extension beam may extend from a portion of the interior walls. The at least one flexible securing protuberance may include two opposed flexible securing protuberances.

Certain embodiments provide a fastener assembly configured to secure a tubular member to a structure. The fastener assembly may include a stud retainer configured to receive and retain a fastener that is configured to securely fasten the assembly to the structure, a tube-retaining section having interior walls that define a tube channel configured to receive the tubular member, and an adaptable tube-engaging member extending into the tube channel. The adaptable tube-engaging member may be configured to securely wrap around more than half an outer circumference of the tubular member. The adaptable tube-engaging member is flexible and resilient, and is configured to securely engage multiple tubular members of different shapes and sizes. The adaptable tube-engaging member may include opposed flexing protuberances that cooperate to wrap around more than half the outer circumference of the tubular member, and at least one flexible securing protuberance configured to wrap around a separate and distinct portion of the outer circumference of the tubular member.

Certain embodiments provide an assembly configured to securely engage a tubular member. The assembly may include a tube-retaining section having interior walls that define a tube channel configured to receive the tubular member, and an adaptable tube-engaging member extending into the tube channel. The adaptable tube-engaging member is configured to securely engage a portion of the tubular member.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE INVENTION

Figure 1:
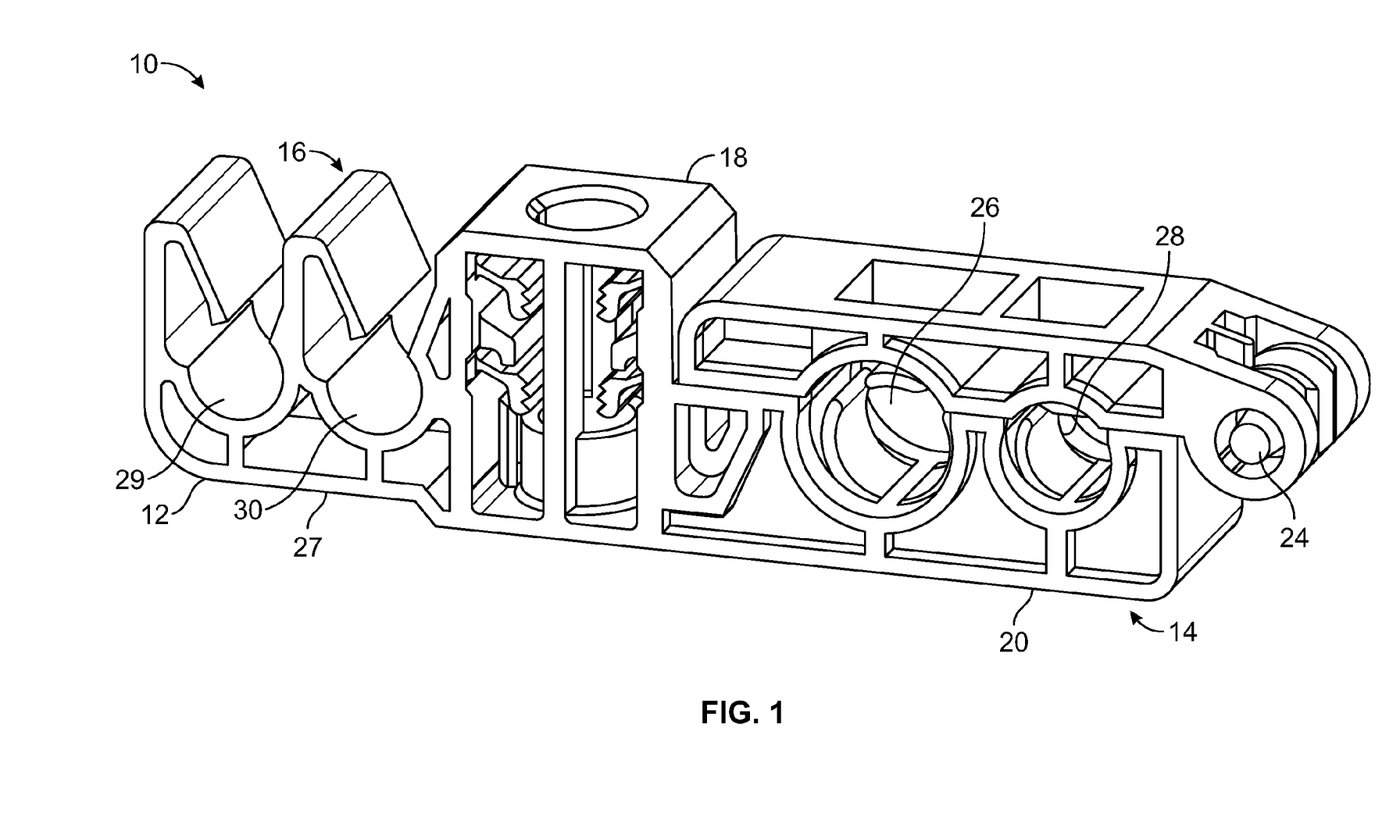
FIG. 1 illustrates an isometric top view of a tube-retaining fastening assembly, according to an embodiment.

FIG. 1 illustrates an isometric top view of a tube-retaining fastening assembly 10, according to an embodiment. The tube-retaining fastening assembly 10 may be formed of injection molded plastic, for example. Alternatively, the assembly 10 may be formed of various other materials such as rubber or other elastomeric materials, metal, or the like. Additionally, the assembly 10 may be integrally molded and formed as an integral piece of injection molded plastic, for example, or the assembly 10 may be formed of more than one of the materials noted above.

The assembly 10 includes a main body 12 that may include tube-retaining sections 14 and 16 that are integrally connected to a stud retainer 18. As shown, the stud retainer 18 is positioned between the tube retaining sections 14 and 16. Optionally, the stud retainer 18 may be positioned at various other locations. For example, the stud retainer 18 may be located at an end of the main body 12.

The tube-retaining section 14 may include a base 20 that is pivotally secured to a latch cover 22 through a hinge 24. The latch cover 22 may be selectively positioned between open and closed positions. For example, the latch cover 22 may include a tab or other such protuberance that is snapably or latchably received by a reciprocal feature formed in the base 20. In the closed position, interior walls of the base 20 and the latch cover 22 define tube channels 26 and 28 that are configured to receive and retain tubes of varying diameters. As shown in FIG. 1, the tube channel 26 may be larger than the tube channel 28. However, the tube channels 26 and 28 may be sized and shaped differently, such that the tube channel 28 is larger than the tube channel 26, or both tube channels 26 and 28 have a similar diameter. Additionally, while tube channels 26 and 28 are shown, the tube-retaining section 14 may include more or less tube channels.

The tube-retaining section 16 may include a base 27 defining open-ended tube channels 29 and 30. The tube channels 29 and 30 may be sized and shaped similarly or differently. Additionally, the tube-retaining section 16 may include more or less tube channels than those shown.

The stud retainer 18 is configured to receive and retain a fastener, such as a threaded stud, bolt, screw, or the like. The stud retainer 18 receives and securely retains the fastener, which may then be fastened to a structure, such as a wall, ceiling, post, or the like. The stud retainer 18 may be similar to the stud retainers shown and described in United States Patent Application Publication No. 2006/0099049, filed Sep. 16, 2005, and United States Patent Application Publication No. 2009/0028668, filed May 7, 2008, both of which are hereby incorporated by reference in their entireties.

Figure 2:
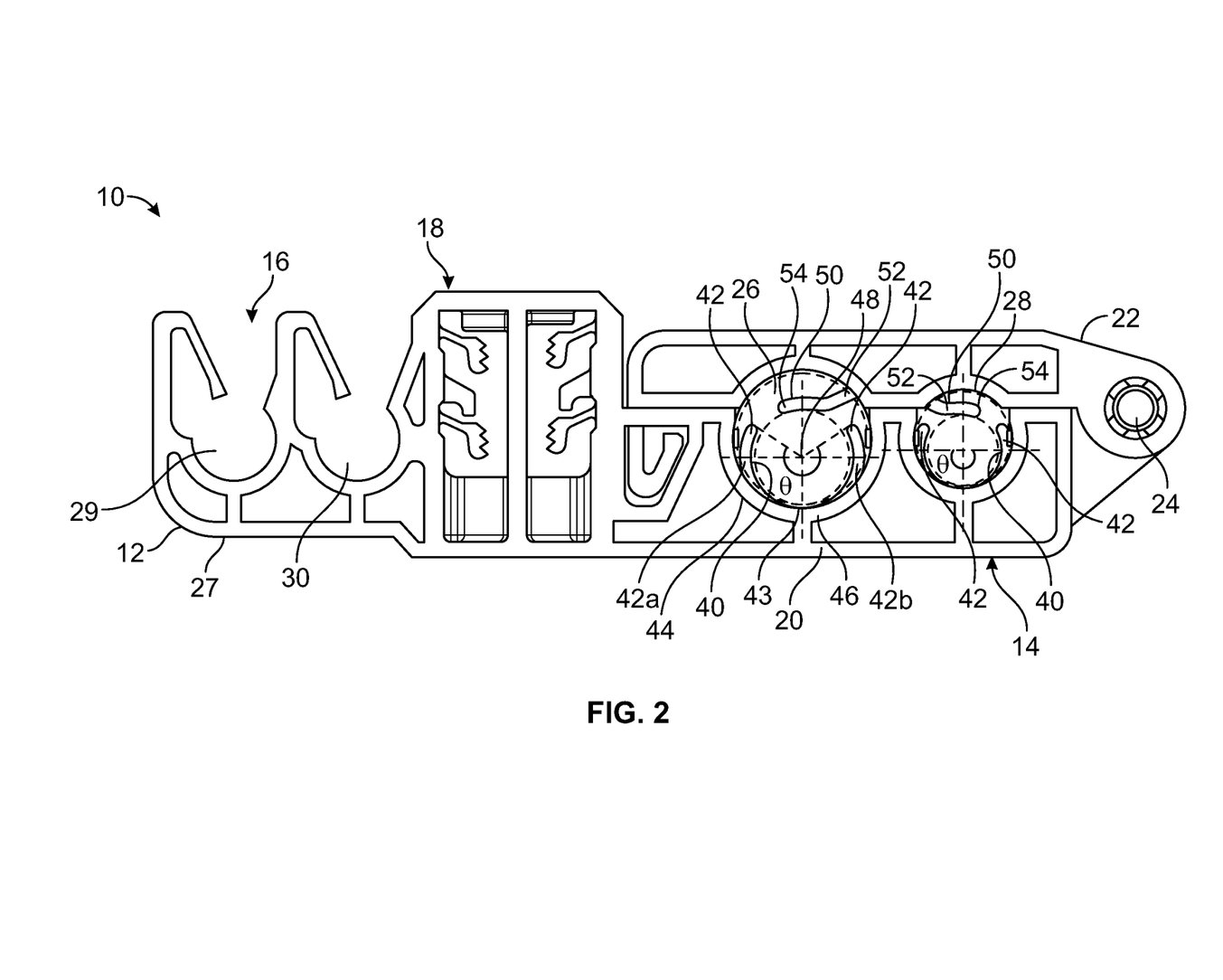
FIG. 2 illustrates a front view of a tube-retaining fastening assembly, according to an embodiment.

FIG. 2 illustrates a front view of the tube-retaining fastening assembly 10. The tube channels 26 and 28 include adaptable tube-engaging members 40. The tube-engaging members 40 are adaptable in that they are resilient, flexible, and may securely receive and retain tubular members of various shapes and sizes. Thus, the tube-engaging members 40 adapt to different sized tubular members. While not shown, the tube channels 29 and 30 may also include adaptable tube-engaging members 40.

The adaptable tube-engaging members 40 include flexing protuberances 42, such as arcuate fingers, beams, prongs, legs, studs, or the like, that extend from the base 20 into the channels 26 and 28. The flexing protuberances 42 may extend from the base 20 toward centers of the channels 26 and 28. The flexing protuberances 42 may include opposed flexing protuberances 42a and 42b that extend into opposed lateral portions 44 and 46 of the base 20. Each flexing protuberance 42a and 42b may extend into the tube channel 26 from an anchor 43 of a wall portion of the base that defines the tube channel 26. Moreover, each of the flexing protuberances 42 may extend from such anchors. Optionally, the opposed flexing protuberances 42a and 42b may integrally connect to one another within the channel 26 at a portion that is anchored to a wall portion that defines the channel 26, for example.

As shown, the flexing protuberances 42 span a radial arc θ, in relation to the center 48 of the opposed protuberances 42a and 42b, for example, within the channels 26 and 28. The arc θ exceeds 180°. The flexing protuberances 42 are formed of a resilient material. As such, the flexing protuberances 42 are configured to flex outwardly to securely engage around outer shafts of tubes. Because the flexing protuberances 42 are resilient, the flexing protuberances 42 may securely engage tubular member, such as tubes, pipes, conduits, or the like, having shafts of varying diameters.

Additionally, each adaptable tube-engaging member 40 may include a flexible securing protuberance 50, such as an arm, finger, beam, prong, leg, stud, or the like, that extends from the latch cover 22 into the channels 26 or 28. Each securing protuberance 50 may include an extension beam 52 that may be a linear beam that extends into the channel 26 or 28. The extension beam 52 integrally connects to an arcuate beam 54 that curves within the channel 26 or 28 in relation to the center 48 of the flexing protuberances 42. The inner diameters of each of the flexing protuberances 42 and the arcuate beams 54 are generally arcuate and are configured to conform to the outer shafts of tubes, pipes, conduits, or the like. Accordingly, the inner diameters of the flexing protuberances 42 and the securing protuberances may form a circular envelope. As shown, the flexing protuberances 42 are configured to wrap around a portion of a tube over a span greater than 180°, while the securing protuberance 50 is configured to wrap around a portion of a tube over a span between 45°-90°, for example. However, the securing protuberance 50 may be shaped and sized to wrap around a tube portion over a greater or lesser range. For example, the protuberances 42 and 54 may cooperate to wrap around an entire circumference of a shaft of a tube. Because each of the protuberances 42 and 50 is flexible, the protuberances 42 and 50 may flex, pivot, or otherwise move to accommodate tubes of varying diameters, shapes, and sizes. Alternatively, instead of a single securing protuberance 50, opposed protuberances, similar to the opposed protuberances 42a and 42b may extend from the latching cover 22 into the channels 26 or 28. Additionally, alternatively, the adaptable tube-engaging members 40 may not include the flexible securing protuberance 50. Instead, the adaptable tube-engaging members 40 may simply include the opposed protuberances 42a and 42b, for example.

Figure 3:
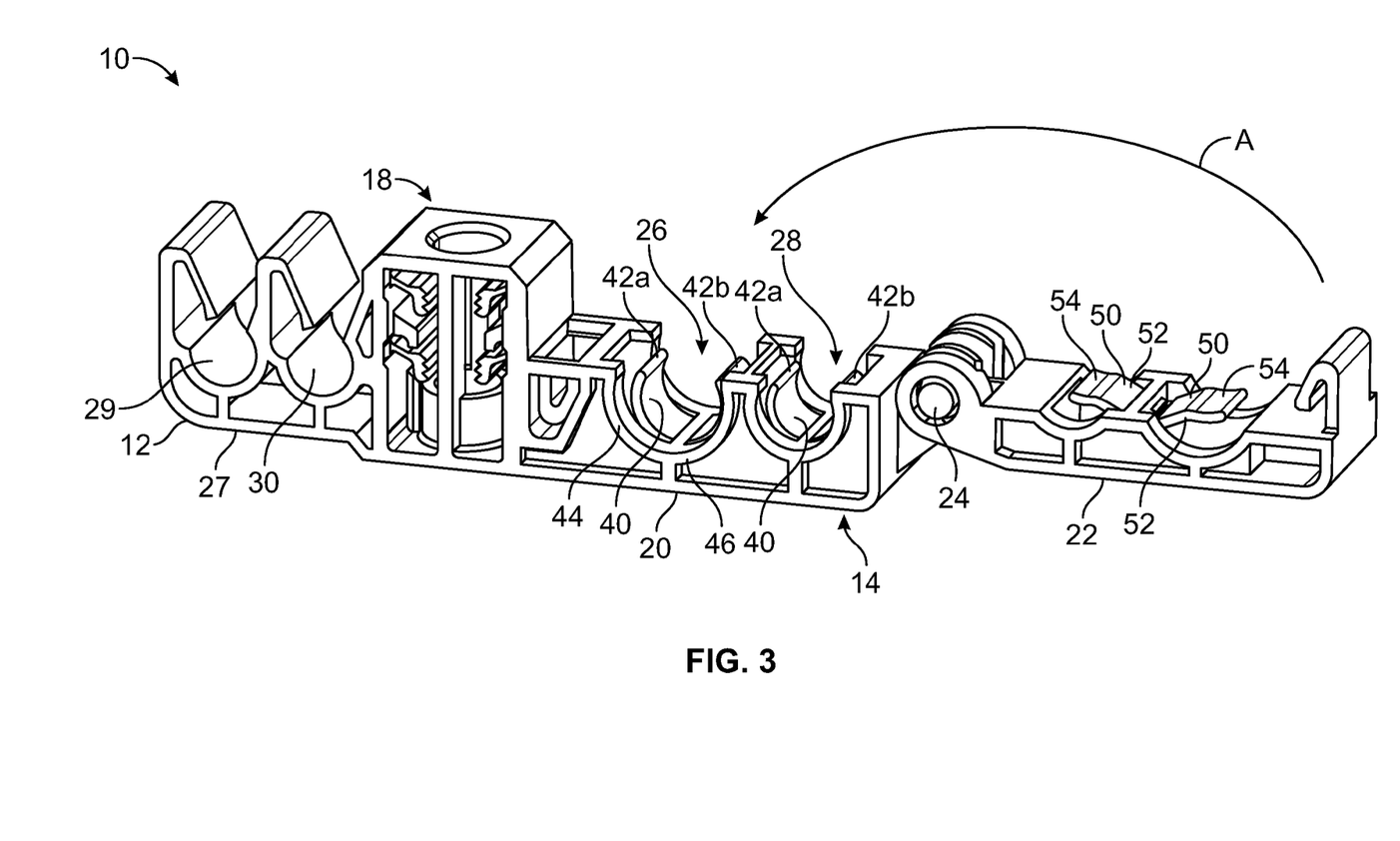
FIG. 3 illustrates an isometric top view of a tube-retaining fastening assembly with an open tube-retaining section, according to an embodiment.
Figure 4:
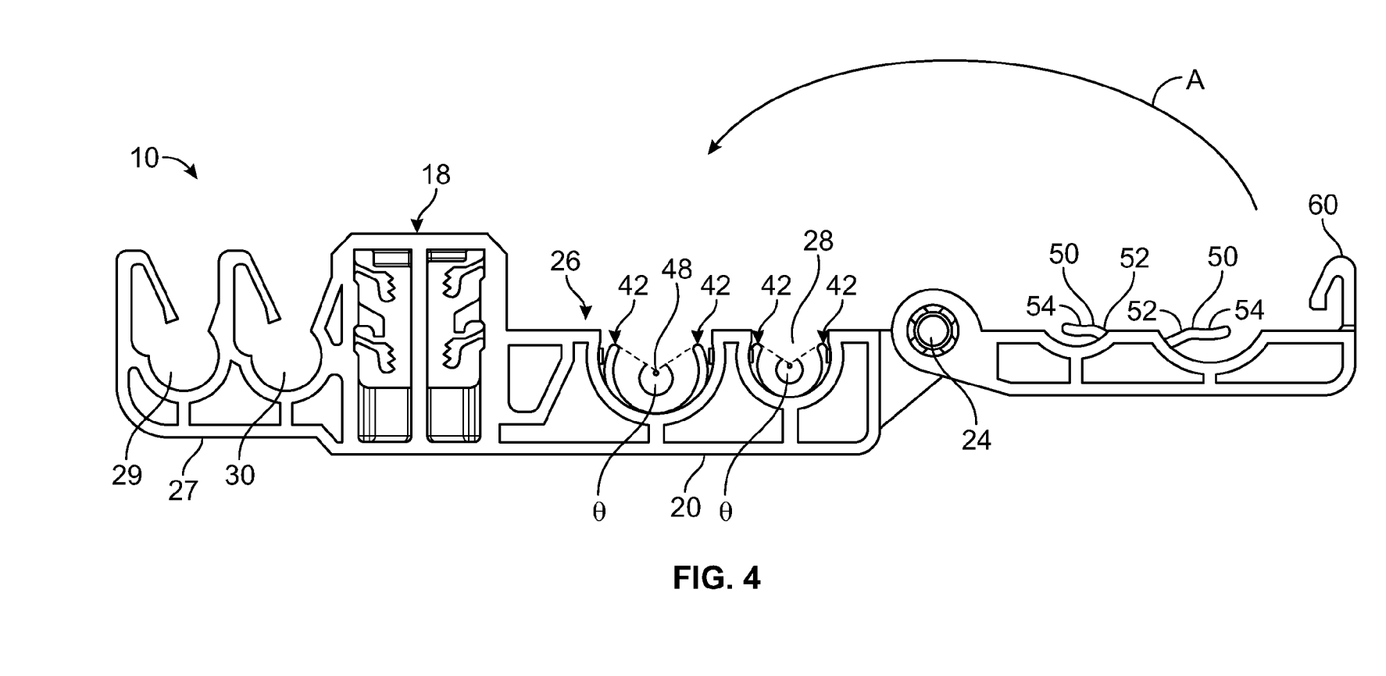
FIG. 4 illustrates a front view of a tube-retaining fastening assembly with an open tube-retaining section, according to an embodiment.

FIGS. 3 and 4 illustrate isometric top and front views, respectively, of the tube-retaining fastening assembly 10 with an open tube-retaining section 14. Referring to FIGS. 3 and 4, in order to insert tubes into the tube channels 26 and 28, the latch cover 22 is pivoted open about the hinge 24. A tube may then be placed within the channel 26 or 28 of the base 20 (or the channel 26 or 28 of the base 20 may be positioned around a tube). Once the tube is positioned within the channel 26 or 28, the protuberances 42a and 42b flex around the tube to accommodate the size and shape of the tube. The protuberances 42a and 42 cooperate to wrap around an arcuate portion of the tube that exceeds 180°. The latching cover 22 may then be pivoted into the closed position about the hinge 24 in the direction of arc A. The latching cover 22 may include a latch 60 that latchably secures to a reciprocal feature, such as a slot or other such opening, formed through the base 20.

Figure 5:
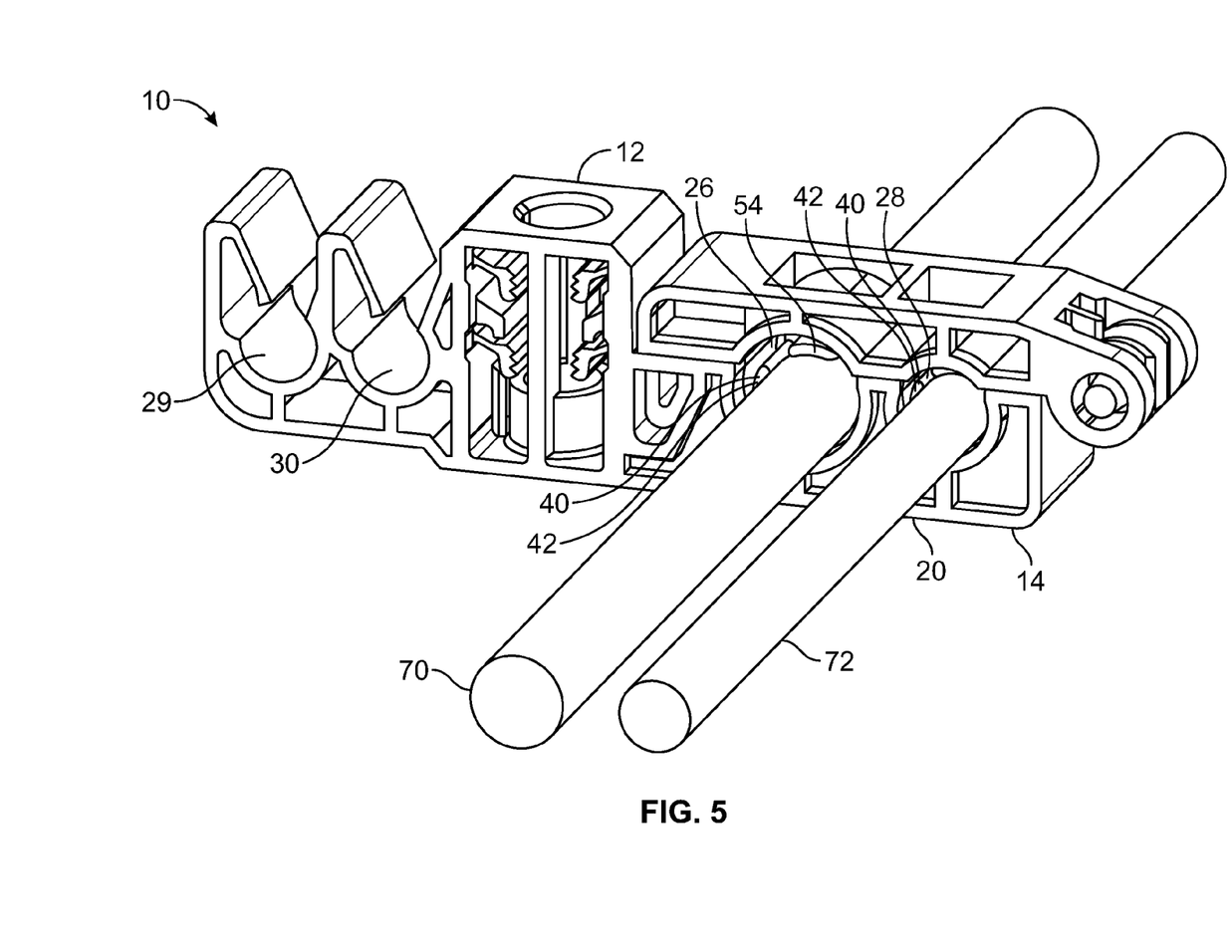
FIG. 5 illustrates an isometric top view of a tube-retaining fastening assembly securely retaining tubes of different diameters, according to an embodiment.

FIG. 5 illustrates an isometric top view of the tube-retaining fastening assembly 10 securely retaining tubes 70 and 72 of different diameters, according to an embodiment. As shown, the tubes 70 and 72 are securely retained within the channels 26 and 28, respectively. The adaptable tube-engaging members 40 securely engage around the tubes 26 and 28 over a range that exceeds 180°. The flexible protuberances 42 within the base 20 form a flexible, compressive interface that wraps over more than half a circumference of a tube. The flexible protuberances 42 extend over a radial arc of more than 180°. A tube pocket of each channel 26 and 28 that includes the flexible protuberances 42 makes full contact with an outer diameter of the tubes 70 and 72, respectively, over a radial arc that exceeds 180°. The adaptable tube-engaging members 40 provide full surface contact with a tube, pipe, conduit, or the like over more than 180° of the circumference of the shaft of the tube, pipe, conduit, or the like, thereby providing sufficient axial slide/thrust force for the tubes 70 and 72. Because the adaptable tube-engaging members 40 are flexible and resilient, the adaptable tube-engaging members 40 may securely retain tubes, pipes, conduits, or the like of different shapes and sizes. Surface engagement with the tubes 70 and 72 that exceeds 180° of the circumference of the tubes 70 and 72 provides increased retaining engagement that reduces the chances of the tubes 70 and 72 sliding through the channels 26 and 28, respectively, or axially shifting therein.

The adaptable tube-engaging members 40 that are shown and described accommodate multiple tube diameters without changing the tube centerline horizontal distance from one another, and/or from a mounting point. While the adaptable tube-engaging members 40 may flex toward or away from the centers of the channels 26 and 28, the tubes 70 and 72 secured therein remain constantly centered due to the conforming engagement of the adaptable tube-engaging members 40 around more than half a circumference of each tube 70 and 72. Further, by wrapping around more than 180° of the tubes 70 and 72, the adaptable tube-engaging members 40 provide a high degree of axial slide/thrust force.

As noted above, while not shown, the tube channels 28 and 30 may also include adaptable tube-engaging members 40. Further, more or less tube channels 26, 28, 29, and 30 may be included within the assembly 10. For example, the assembly 10 may include six tube channels, each with adaptable tube-engaging members 40. Alternatively, the assembly 10 may include a single tube channel integrally connected to a stud retainer 18, for example. Additionally, the assembly 10 may include various other fastening portions in addition to, or in lieu of, the stud retainer. For example, instead of a stud retainer, the assembly 10 may include a planar mounting surface having a through-hole configured to receive a fastener, such as a screw or bolt. Additionally, for example, the assembly 10 may include an integral fastener, such as a w-prong, box-prong, pine tree fastener, or the like.

Figure 6:
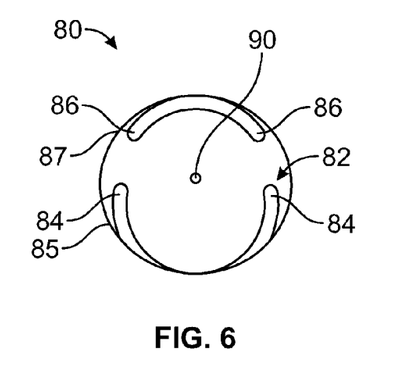
FIG. 6 illustrates a front view of a tube channel, according to an embodiment.

FIG. 6 illustrates a front view of a tube channel 80, according to an embodiment. The tube channel 80 includes an adaptable tube-engaging member 82 that extends into the tube channel 80 from interior walls of a fastener assembly, for example. The tube-engaging member 82 may include opposed flexible protuberances 84 extending from a lower portion 85, and opposed flexible protuberances 86 extending from an upper portion 87. The protuberances 84 and 86 are configured to flex with respect to a center 90 of the tube channel 80. As shown, the protuberances 84 and 86 may be configured to wrap around almost an entire circumference of a tube.

Figure 7:
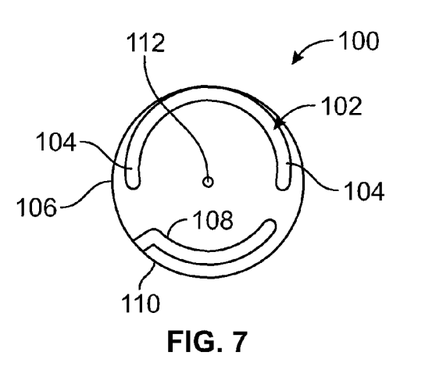
FIG. 7 illustrates a front view of a tube channel, according to an embodiment.

FIG. 7 illustrates a front view of a tube channel 100, according to an embodiment. The tube channel 100 includes an adaptable tube-engaging member 102 that extends into the tube channel 100 from interior walls of a fastener assembly, for example. The tube-engaging member 102 may include opposed flexible protuberances 104 extending from an upper portion 106, and a flexible securing protuberance 108 (similar to the flexible securing protuberance 50) extending from a lower portion 110. The protuberances 104 and 108 are configured to flex with respect to a center 112 of the tube channel 100.

Figure 8:
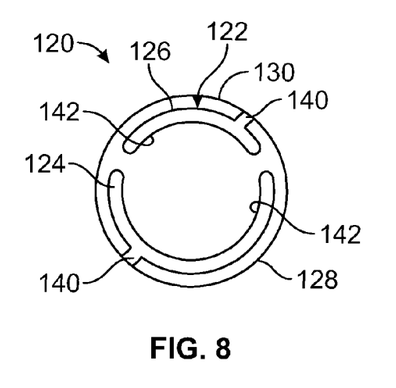
FIG. 8 illustrates a front view of a tube channel, according to an embodiment.

FIG. 8 illustrates a front view of a tube channel 120, according to an embodiment. In this embodiment, an adaptable tube-engaging member 122 includes flexible securing protuberances 124 and 126 that extend into lower and upper portions 128 and 130, respectively, of the tube channel 120. Each securing protuberance 124 and 126 includes an extension beam 140 that may linearly extend into the channel 120. The extension beam 140 is integrally connected to an arcuate beam 142. One of the arcuate beams 142 may curve over a radial arc of more than 180°. Thus, one of the arcuate beams 142 may wrap around more than half an outer circumference of a tube.

Figure 9:
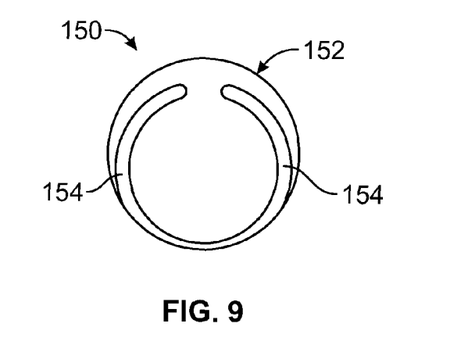
FIG. 9 illustrates a front view of a tube channel, according to an embodiment.

FIG. 9 illustrates a front view of a tube channel 150, according to an embodiment. In this embodiment, an adaptable tube-engaging member 152 includes opposed flexible protuberances 154 that are configured to wrap around almost an entire circumference of a tube. While the flexible protuberances 154 are shown extending from a lower portion of an assembly that defines the tube channel 150, the flexible protuberances 154 may extend from any other portion of the assembly that defines the tube channel 150.

Thus, embodiments provide an assembly that securely engages around tubes, pipes, conduits, or the like through more than just a circular tube opening. Embodiments provide adaptable tube-engaging members that extend into tube channels that securely engage around tubes, pipes, conduits, and the like of varying shapes and sizes.

The adaptable tube-engaging members that are shown and described accommodate multiple tube diameters without changing a centerline horizontal distance from one another, and/or from a mounting point. While the adaptable tube-engaging members may flex toward or away from the center of the receiving channel, the tubes secured therein remain constantly centered due to the conforming engagement of the adaptable tube-engaging members around more than half a circumference of each tube. Further, by wrapping around more than 180° of a tube, the adaptable tube-engaging members provide a higher axial slide/thrust force than previous assemblies.

While various spatial and directional terms, such as top, bottom, lower, mid, lateral, horizontal, vertical, front and the like may be used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the embodiments disclosed and defined herein extend to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A fastener assembly configured to secure a tubular member to a structure, the fastener assembly comprising:
   a stud retainer configured to receive and retain a fastener that is configured to securely fasten the assembly to the structure;
   a tube-retaining section having interior walls that define a tube channel configured to receive the tubular member; and
   an adaptable tube-engaging member extending into the tube channel, wherein the adaptable tube-engaging member is configured to securely wrap around more than half an outer circumference of the tubular member, wherein the adaptable tube-engaging member is flexible and resilient, wherein the adaptable tube-engaging member is configured to securely engage multiple tubular members of different shapes and sizes, wherein the adaptable tube-engaging member comprises:
      opposed flexing protuberances that cooperate to wrap around a first portion of the outer circumference of the tubular member, wherein each of the opposed flexing protuberances comprises an arcuate finger configured to engage around a portion of the tubular member; and
      at least one flexible securing protuberance configured to wrap around a separate and distinct second portion of the outer circumference of the tubular member, wherein the at least one flexible securing protuberance comprises an extension beam integrally connected to an arcuate beam having a free end, wherein the extension beam extends from a portion of the interior walls.

2. A fastener assembly configured to secure a tubular member to a structure, the fastener assembly comprising:
   a stud retainer configured to receive and retain a fastener that is configured to securely fasten the assembly to the structure;
   a tube-retaining section having interior walls that define a tube channel configured to receive the tubular member; and
   an adaptable tube-engaging member extending into the tube channel, wherein the adaptable tube-engaging member is configured to securely engage a portion of the tubular member, wherein the adaptable tube-engaging member is flexible and resilient, and wherein the adaptable tube-engaging member is configured to securely engage multiple tubular members of different shapes and sizes, wherein the adaptable tube-engaging member is configured to wrap around more than half an outer circumference of the tubular member, wherein the adaptable tube-engaging member comprises opposed flexing protuberances and at least one flexible securing protuberance that differs in shape from each of the opposed flexing protuberances, wherein each of the opposed flexing protuberances comprises an arcuate finger configured to engage around a portion of the tubular member, and wherein the at least one flexible securing protuberance comprises an extension beam integrally connected to an arcuate beam having a free end that extends into the tube channel, wherein the extension beam extends from a portion of the interior walls.

3. The fastener assembly of claim 1, wherein the opposed flexing protuberances are configured to wrap around more than half an outer circumference of the tubular member.

4. The fastener assembly of claim 1, wherein the at least one flexible securing protuberance comprises two opposed flexible securing protuberances.

5. The fastener assembly of claim 2, wherein the at least one flexible securing protuberance is configured to wrap around a separate and distinct portion of the tubular member than the portion of the tubular member.

6. An assembly configured to securely engage a tubular member, the assembly comprising:
   a tube-retaining section having interior walls that define a tube channel configured to receive the tubular member; and
   an adaptable tube-engaging member extending into the tube channel, wherein the adaptable tube-engaging member is configured to securely engage a portion of the tubular member, wherein the adaptable tube-engaging member is flexible and resilient, wherein the adaptable tube-engaging member is configured to securely engage multiple tubular members of different shapes and sizes, wherein the adaptable tube-engaging member is configured to wrap around more than half an outer circumference of the tubular member, wherein the adaptable tube-engaging member comprises opposed flexing protuberances and a single flexible securing protuberance that differs in shape from each of the opposed flexing protuberances, wherein each of the opposed flexing protuberances comprises an arcuate finger configured to engage around a portion of the tubular member, and wherein the flexible securing protuberance comprises an extension beam integrally connected to an arcuate beam having a free end that extends into the tube channel, wherein the extension beam extends from a portion of the interior walls.

7. The assembly of claim 6, wherein the opposed flexing protuberances are configured to wrap around more than half an outer circumference of the tubular member.

8. The assembly of claim 6, wherein the flexible securing protuberance is configured to wrap around a separate and distinct portion of the tubular member than the portion of the tubular member.

* * * * *